United States Patent [19]

Strobl et al.

[11] Patent Number: 5,414,600
[45] Date of Patent: May 9, 1995

[54] CONDENSING AND COLLECTING OPTICAL SYSTEM USING AN ELLIPSOIDAL REFLECTOR

[75] Inventors: Karlheinz Strobl; Glenn S. Baker; Douglas M. Brenner, all of Los Angeles; Robert L. Piccioni, Thousand Oaks, all of Calif.

[73] Assignee: Cogent Light Technologies, Inc., Santa Clarita, Calif.

[21] Appl. No.: 99,953

[22] Filed: Jul. 30, 1993

[51] Int. Cl.$^6$ ............................................. F21V 7/09
[52] U.S. Cl. ................................... 362/32; 362/261; 362/263; 362/267; 362/298; 362/346
[58] Field of Search ............... 362/32, 261, 263, 298, 362/299, 300, 302, 304, 305, 346, 255, 256, 267

[56] References Cited

U.S. PATENT DOCUMENTS

| | | | |
|---|---|---|---|
| 1,818,875 | 8/1931 | Wardwell | 362/299 |
| 1,835,745 | 12/1931 | Barbian | 362/300 |
| 3,122,330 | 2/1964 | Trentini | 362/261 |
| 3,476,930 | 11/1969 | Herman et al. | 362/296 |
| 3,798,441 | 3/1974 | Wilson | 362/261 |
| 3,886,544 | 5/1975 | Narodny | 362/32 |
| 4,254,456 | 3/1981 | Grindle et al. | 362/300 |
| 4,458,302 | 7/1984 | Shiba et al. | 362/298 |
| 4,757,431 | 7/1988 | Cross et al. | 362/261 |
| 4,887,190 | 12/1989 | Sadamune et al. | 362/32 |
| 4,897,771 | 1/1990 | Parker | 362/298 |
| 5,124,891 | 6/1992 | Blusseau | 362/263 |
| 5,222,793 | 6/1993 | Davenport et al. | 362/32 |

FOREIGN PATENT DOCUMENTS

| | | | |
|---|---|---|---|
| 2441860 | 6/1980 | France . | |
| 485052 | 5/1938 | United Kingdom | 362/298 |
| 215940 | 12/1985 | United Kingdom . | |

*Primary Examiner*—Ira S. Lazarus
*Assistant Examiner*—Alan B. Cariaso

*Attorney, Agent, or Firm*—Blakely, Sokoloff, Taylor & Zafman

[57] ABSTRACT

An off-axis optical system for collecting and condensing electromagnetic radiation utilizes an ellipsoidal reflector or a portion thereof configured so that the effects of magnification and optical aberrations (caused by the off-axis arrangement and an aspherical source envelope) are minimized. This is accomplished by the utilization of a specially designed ellipsoidal reflector having primary and secondary focal points along the major axis of the reflector or an effective reflecting portion thereof defined as that portion which is both illuminated by the source and subtended by the acceptance cone of the target. In the preferred embodiment, a single ellipsoidal reflector is configured with its major axis both non coincident with its geometric optical axis and with the optical axis of the target at an angle greater than zero degrees so as to reduce substantially the distance at which a focused image is formed and to achieve an average magnification near unity thereby maintaining the brightness of the source at the target. The radiant flux at the location of the target can be increased by incorporating a retro-reflector of toroidal or spherical design. In a second embodiment, the components forming the optical system of the present invention are arranged in a self-contained nautilus-shaped housing wherein the inner surface of the housing preferably comprises a reflector encompassing the retro-reflector, an effective ellipsoidal reflecting portion and a window through which the image is projected onto the target. In a third embodiment, the present invention utilizes a compound ellipsoidal reflector configuration having two ellipsoidal reflecting surfaces arranged so as to have a common focus, at which point a radiation source is located. In this embodiment, two targets located at the remaining foci of the respective reflectors are illuminated with a high flux density.

33 Claims, 11 Drawing Sheets

CONDENSING AND COLLECTING OPTICAL SYSTEM USING AN ELLIPSOIDAL REFLECTOR

FIELD OF THE INVENTION

This invention relates to systems for collecting and condensing electromagnetic radiation, particularly a system for providing a high radiance to a small target such as an optical fiber.

BACKGROUND OF THE INVENTION

Conventional collecting and condensing designs for electromagnetic radiation emphasize collecting and redirecting the maximum amount of light from a source of radiation, approximated by a point source. To produce a small spot size based on these designs results in a decrease in radiation flux because conventional designs (which focus on the collection and redirection of the maximum amount of light) inherently conflict with the goal of concentrating the radiation flux into the smallest possible spot size when the radiation originates from conventional incoherent sources. Thus, images having small spot sizes may be obtained only with a corresponding decrease in flux density.

There are two basic optical designs in common use for collecting and condensing radiation. The first is a system of condenser lenses such as illustrated in FIG. 1. Condenser lenses have several problems which include the creation of chromatic and spherical aberrations and the large amount of space which is required for the setup. Ellipsoidal reflectors (as shown in FIG. 2a) are also used in prior art systems. As used in the prior art, the source of electromagnetic radiation is placed at the primary focal point, and the target (e.g., a fiber optic bundle) is placed at the secondary focal point with the fiber axis, 18, parallel to the major axis, 12, of the ellipsoid. Both primary and secondary focal points are collinear with the optical axis which is identical to the major axis. Such a system would be described as an "on-axis" system and has a number of disadvantages including high cost; higher than desirable magnification of the image, resulting in a reduction of flux density collectable by a small target such as a fiber optic; shadowing of radiation reducing the total collectable flux; and incomplete utilization of the surface of the reflector. On-axis ellipsoidal reflecting systems tend to emphasize redirection of the maximum amount of flux from a point source at the expense of the flux density, as discussed above.

U.S. Pat. No. 4,757,431 (FIG. 3a) describes an improved condensing and collecting system employing an "off-axis" spherical concave reflector which increases the amount of flux illuminating and collectable by a small target. The off-axis spherical concave reflector described in this patent has certain disadvantages: (i) the presence of optical aberrations and astigmatism parallel to the direction of the off-axis displacement and (ii) physical limitations inherent in the requirement to minimize the off-axis distance. The effect of astigmatism is to decrease the concentrating efficiency of the system and thereby reduce the flux collected at the target. The requirement to minimize the off-axis distance between the source and the target (so as to minimize the astigmatic distortion), imposes limitations on the physical dimensions of a source and target of the described embodiment. Improvements in the collection efficiency of the off-axis system can be made by substituting for the spherical reflector a toroidal reflector (FIG. 3b) which reduces the astigmatism and optical aberrations inherent in the off-axis configuration. However, inherent limitations in a toroidal off-axis system prevent maximum collection efficiency.

The invention described below is an "off-axis" ellipsoidal condensing and collecting system of radiation. In comparing the two systems shown in FIG. 2b and FIG. 2a, some major differences between the off-axis and the on-axis systems include the following with respective to the off-axis 14 system: (i) the optical axis of the target will always be situated at an angle greater than zero degrees to the major axis 21 of the ellipsoid along which are located source S and target T separated by a source-target distance, ST, and (ii) the optical or geometric axis, 12, of the reflecting portion, P, of the ellipsoidal reflector M1 will not coincide with the major axis 21 by contrast to the on-axis system of FIG. 2a in which both the major axis and the geometric or optical axis of the ellipsoid are coincident. Compared to the prior art "off-axis" condensing and collecting system, FIG. 3a, the present invention is a more exact imaging system of unit magnification which preserves the brightness of the source at the target and therefore provides substantial improvements in the coupling of radiation between a source and a target.

SUMMARY OF THE INVENTION

The present invention represents an improvement over the system disclosed in U.S. Pat. No. 4,757,431 as well as prior art for collecting and condensing electromagnetic radiation with ellipsoidal reflectors. The present invention overcomes the limitations of the other prior art configurations in minimizing both optical aberrations and magnification. This is accomplished in the preferred embodiment (FIG. 4) by substituting a specially designed ellipsoidal reflector having primary, F1, and secondary, F2, focal points symmetric about the optical axis 12 of the reflector which is coincident with the minor axis, 10, of the ellipsoidal surface of which reflector M1 is a portion. The primary and secondary focal points define the position of the source, S, of electromagnetic radiation and the target, T, respectively, and the fiber axis, 14, intersects the major axis at an angle $>0°$. The system preserves the brightness of the source at the target by a 1:1 imaging of the source. In an alternate embodiment, the optical system of the present invention utilizes only an effective reflecting portion, P, of the ellipsoidal reflector, M1, defined as that portion which is both illuminated by the source and subtended by the acceptance cone of the target (FIG. 2b).

Although the arrangement of the source, target and reflector in the present invention appears similar to the off-axis configuration described in U.S. Pat. No. 4,757,431, (FIG. 3a) the present system (i) provides an imaging system which better conserves the brightness of the source, (ii) can obtain a magnification of approximately unity as defined by a particular set of parameters for the source, target, and ellipsoidal reflector, (iii) imposes no restrictions on the "off-axis displacement," and (iv) maximizes the collectable flux density by a small target. In contrast to other optical systems which utilize ellipsoidal reflectors having an optical axis coincident with the major axis (FIG. 2a) and both primary and secondary focal points disposed along the optical axis, the optical axis of the target, 14, in the present invention (defined as the central axis of the target's acceptance cone) is disposed at an angle ($>0°$) to the major axis. In this way, not only can the system be optimized for unit magnification, but the distance at which a focused image is formed is also minimized relative to prior art "on-axis" ellipsoidal geometries. This improved off-axis arrangement performs substantially better than the prior art in the following ways: (i) it reduces optical aberrations (i.e., the astigmatic distortion caused by prior art off-axis systems), thereby improving both the imaging and concentrating power of the system and facilitating the collection of radiation emitted by a point-like source of electromagnetic radiation into a small target; (ii) it maximizes in the preferred embodiment the radiation flux directed into and collectable by a small target by maintaining a unit magnification; (iii) it maximizes the collection and coupling efficiency between a source of electromagnetic radiation and a small target for any "off-axis" optical system as described in U.S. Pat. No. 4.757,431 or "on-axis" optical systems and (iv) permits the collection efficiency to be independent of the source-target distance.

In one embodiment (FIG. 4), a single ellipsoidal reflector is configured with its major axis at an angle with respect to the optical axis of the target so as both to reduce substantially the distance at which a focused image is formed and to achieve an average magnification near unity. The target is placed substantially near the focused image which forms the location of maximum flux density. This is significantly different from prior art (FIG. 2a) in that the average magnification of the image using the present invention is approximately equal to unity and the distance at which a focused image is formed is minimized. The radiant flux at the location of the target can be increased by incorporating a retro-reflector, M2 (FIG. 5a), of toroidal or spherical design, for which an optimized toroid produces maximized brightness from the source and therefore maximum flux density at the target.

In a second embodiment, the components forming the optical system of the present invention are arranged in a nautilus-shaped housing (See FIG. 7a and FIG. 7b) wherein the inner surface of the housing comprises a reflector encompassing a retro-reflector, an effective ellipsoidal reflecting portion and a window. This housing can be adapted to house permanently either a self-contained short arc lamp (not shown) or the electrodes of a short arc lamp radiation source (FIG. 7b) wherein the housing is completely sealed and pressurized with a gas to maintain the brightness of the source of light. Alternatively as shown in FIG. 7a, a circular aperture can be formed in the top of the housing concentric with the circular portion of the housing so as to permit the use of a detachable, plug-in lamp. The image of concentrated radiation is coupled to a small target through a window in such a housing which forms either a planar surface of an imaging or non-imaging element or a planar surface adapted with a hemispherical, non-imaging window formed therein for the reception and attachment of a fiber optic target.

Finally, in a third embodiment (FIG. 8), the present invention utilizes a compound ellipsoidal reflector, M3, configuration having two ellipsoidal reflecting surfaces, M3a and M3b, arranged so as to have a common focus, F1, at which point a radiation source is located. In this case, two targets, T1 and T2, located at the remaining foci of the respective reflectors, F2, are illuminated with a high flux density. Furthermore, due to the fact that the present invention relaxes the prior art requirement of minimizing the separation distance between the source and target, a retro-reflector, M4, of toroidal or spherical design may easily be implemented in a compound ellipsoidal reflector configuration so as to maintain the brightness at each of the two targets.

DETAILED DESCRIPTION OF THE INVENTION

In the following description, for purposes of explanation and not limitation, specific details are set forth, such as particular dimensions, numbers, optical components, etc. in order to provide a thorough understanding of the present invention. However, it will be apparent to one skilled in the art that the present invention may be practiced in other embodiments that depart from these specific details. In other instances, detailed descriptions of well-known devices and techniques are omitted so as not to obscure the description of the present invention with unnecessary details.

Figure 4:
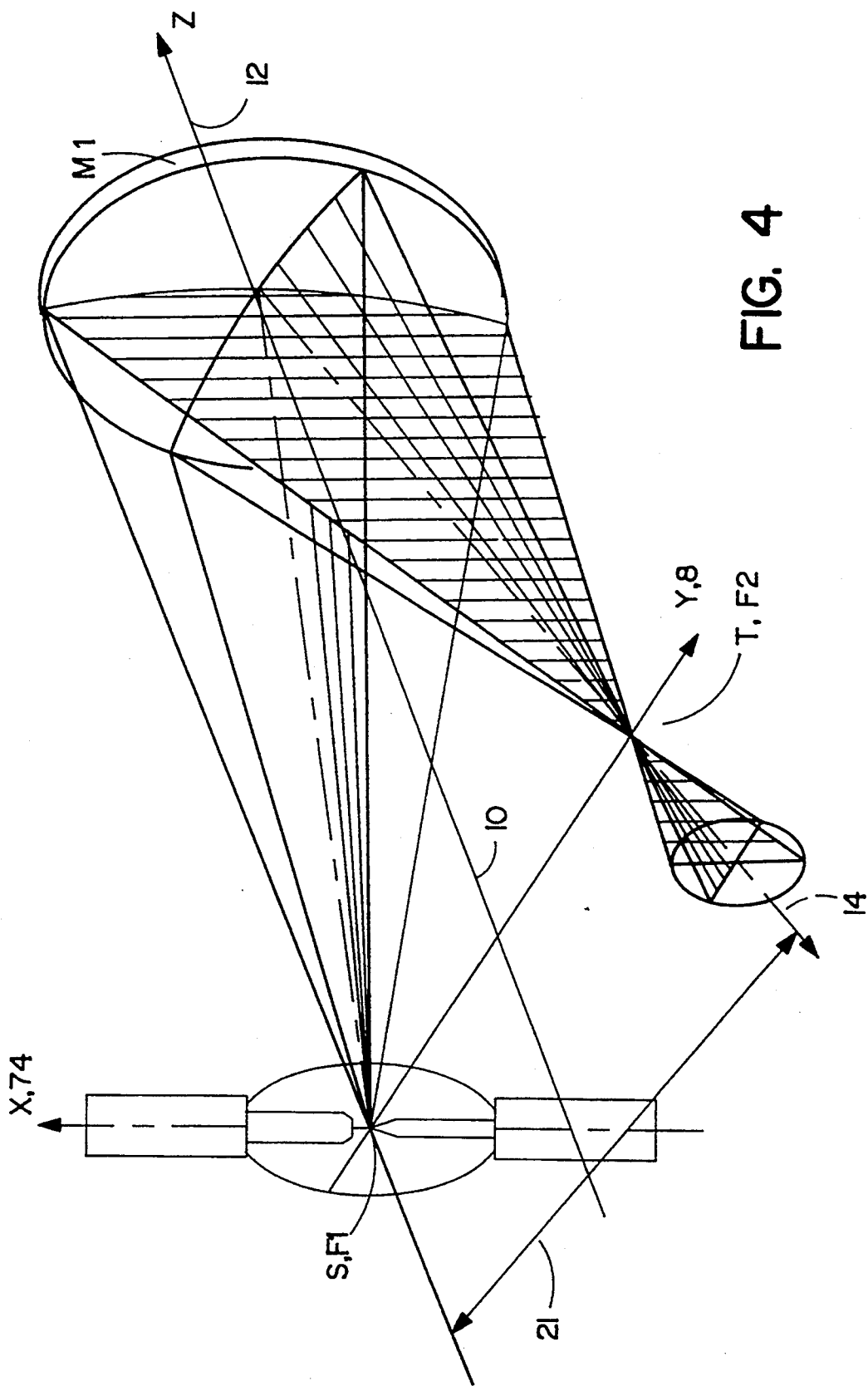
FIG. 4 is a perspective view of a first embodiment of the optical system of the present invention employing an ellipsoidal reflector.

A condensing and collecting optical system built in accordance with the present invention and shown in FIG. 4, consists of three main components including a source S, a primary reflector M1 and a target T. However, a fourth, optional component, the retro-reflector M2, is preferably used to improve the performance of the system.

(1) Source. An optical point source S represents a source of electromagnetic radiation. In the context of this invention, a point source S is any compact source of electromagnetic radiation whose angular extent is small and emits flux into $4\pi$ steradians. Typically, the linear angular size of such a source S is no more than 0.1 radian. For example, a typical source S may be an electric arc lamp with an arc gap of approximately 1 mm placed in front of a concave reflector at a distance of approximately 50 mm. In practice, such a source S is an extended source. In the preferred embodiment, this is a compact xenon arc lamp with an arc gap $\leq 1$ mm and a quartz lamp envelope or ceramic enclosure 5 with a quartz window. Any source S of electromagnetic radiation which is of similar size to or smaller than the target T may be used (e.g., a fiber, filament lamp, gas discharge lamp, laser, LED, semi-conductor, etc.) to achieve optimum performance of the system.

The size of the electromagnetic source S here is better defined by the $1/e$ intensity of an intensity contour map which characterizes the brightness (flux density over angular extent) of the source S. Brightness is related to the size of the arc gap and determines the theoretical limit of coupling efficiency. For the specific case of an arc lamp, the intensity contour approximates axial symmetry and is a complex function of electrical rating, electrode design and composition, gas pressure, arc gap size and gas composition. For the specific case of an arc lamp having an aspherical, curved envelope 5, the effective relative position and intensity distribution of the source is distorted by the shape of the envelope 5 which functions as a lens and normally requires a compensating optical element. Optical compensation can be achieved either by modifying the design of the ellipsoidal reflector M1 to compensate for the astigmatism caused by the envelope 5 or by inserting a correcting optic between the reflector M1 and the target T (see below). Additionally, optical coatings can be applied to the envelope 5 to minimize Fresnel reflections and thereby maximize collectable radiation at the target T or to control and/or filter the radiation flux.

Figure 5A:
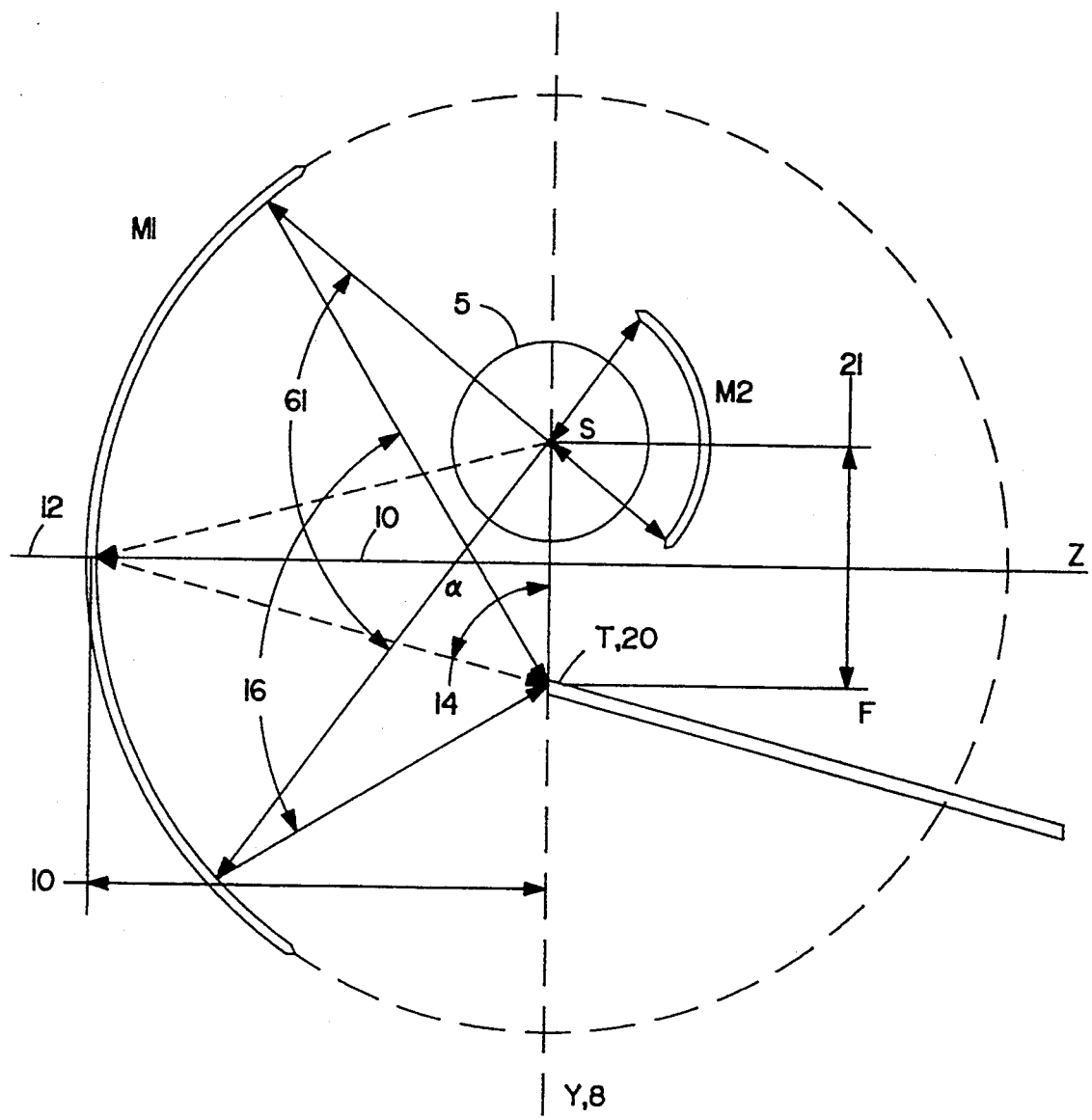
FIG. 5a is a schematic view of the optical system of FIG. 4 in the y-z plane showing the arrangement of a source having an envelope, a fiber optic target and a retro-reflector.

(2) Primary Reflector. The primary reflector M1 reflects and focuses electromagnetic radiation from the sources onto the target T. In the present invention as shown in FIG. 2b, the primary reflector M1 is defined by an ellipsoidal surface concave relative to the source, S, and target, T, having an effective ellipsoidal reflecting portion, P, which comprises either the entire surface or a portion of the primary reflector, M1. By definition the primary ellipsoidal reflector M1 will have a primary focal point $F_1$ and a secondary focal point $F_2$ which lie on the major axis 8 of the ellipsoid and are bisected by the minor axis 10. In the preferred embodiment of the present invention, as shown in FIG. 4 and 5a, the optical axis 12 of the reflector M1 is chosen to coincide with the minor axis 10 of the ellipsoid as well as its geometric axis (i.e., the normal that bisects the source-target separation distance) when the target T is positioned to achieve unit magnification (see below). Preferably, the source S and target T are equidistant from the minor axis 10 of the ellipsoid and located respectively at $F_1$ and $F_2$. Although the optical axis 12 of the reflector M1 may be coincident with minor axis 10 of the ellipsoid, this is not necessary and will depend (i) on what effective reflecting portion P of the ellipsoidal reflector M1 is actually chosen for reflecting and concentrating light at the target T, (ii) at what angle the target T is positioned (iii) and at what magnification the maximum flux density is collectable by a given target T. For a fiber optic target T, the latter will depend on the relative size and numerical aperture of the optical fiber compared to that of the source S.

Figure 6A:
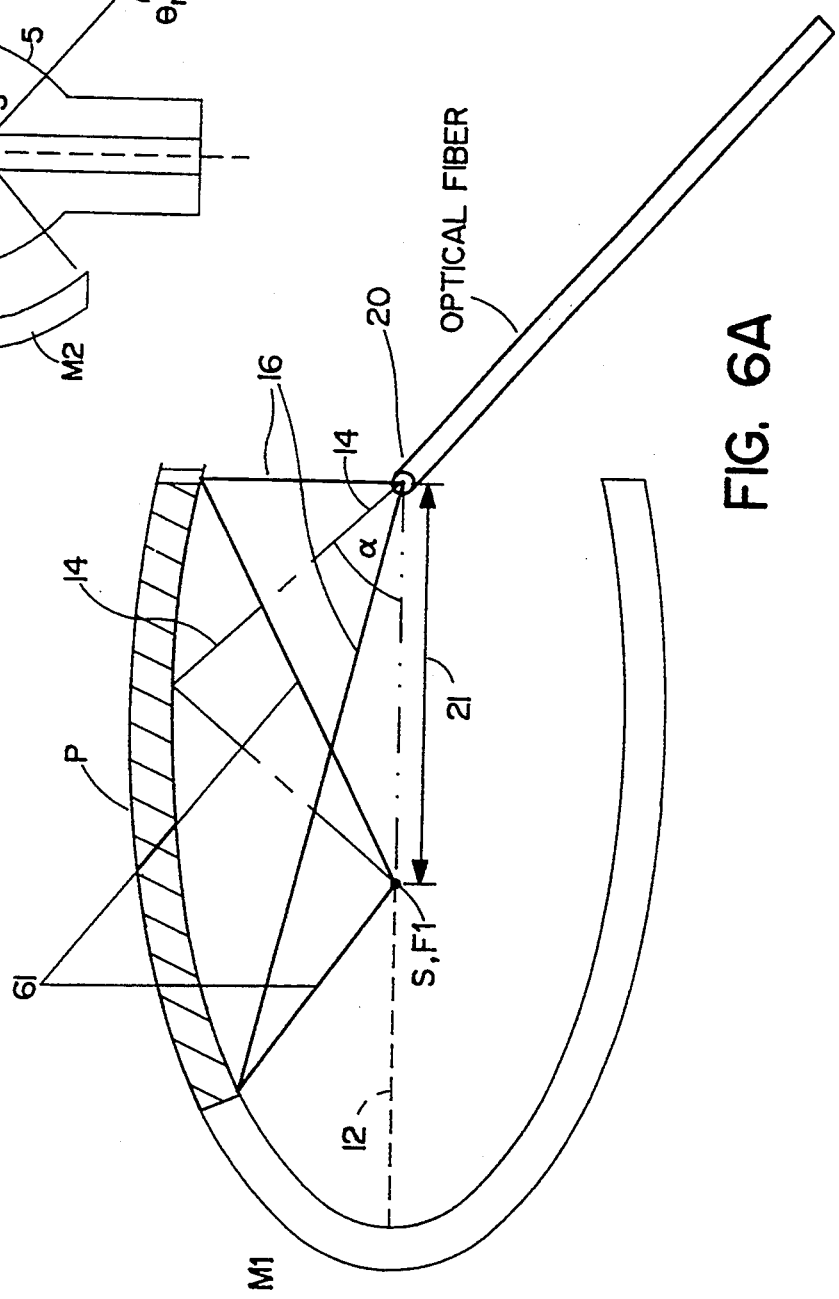
FIG. 6a is a schematic view of a variation on the first embodiment of the present invention showing an off-axis system in which only an effective reflecting portion of an ellipsoidal reflector is utilized, the ellipsoidal reflector in this case having an optical axis coincident to the major axis of the ellipse but different from the optical axis of the target.
Figure 6B:
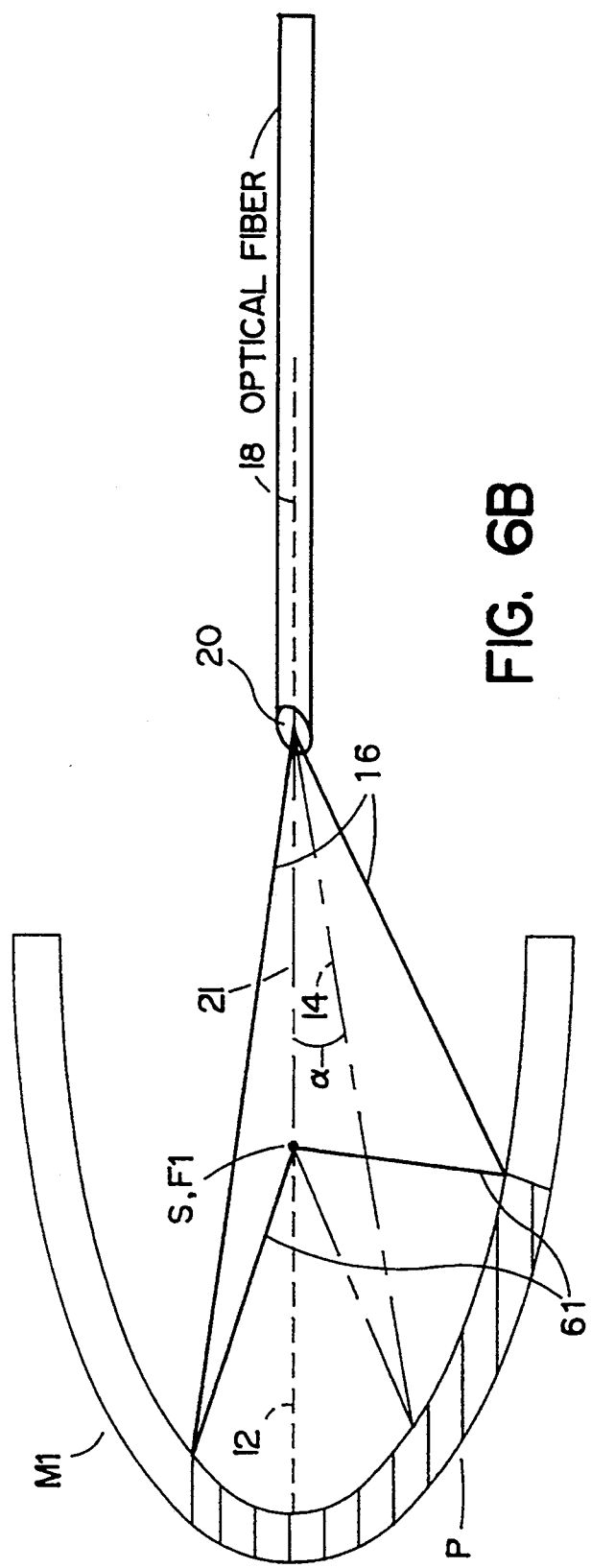
FIG. 6b is a schematic view of the embodiment of FIG. 6a illustrating the use of an effective reflecting portion of an ellipsoidal reflector in a case where the optical axis of the reflector is coincident with the longitudinal axis of the fiber optic target, but not coincident with the optical axis of the target.

For example, in the alternate embodiment shown in FIGS. 6a and 6b, the off-axis optical system of the present invention may also be configured similar to the prior art on-axis ellipsoidal reflector system wherein the optical axis 12 of the entire reflector is coincident with major axis 8 of the ellipsoid. Nonetheless, this configuration still defines an off-axis optical system since the optical axis of the target 14 is not coincident with the major axis 8 of the ellipsoid, but is oriented at an angle $\alpha > 0°$. (The optical axis of the target is defined as the central axis or average direction of the acceptance cone 16 for a fiber optic target and is the bisection of the full angle of acceptance which is proportional to the numerical aperture of the optical fiber.) In such a case, that portion P of the ellipsoidal reflector M1 which is both illuminated by the source S and subtended by the acceptance cone 16 of the target T is referred to as the effective reflecting portion P of the ellipsoidal reflector M1. In general the target optical axis does not coincide with the reflector optical axis. Furthermore, as shown in the alternate embodiment FIG. 6b, even though the reflector optical axis 12 coincides with both the major axis 8 of the ellipsoid and the longitudinal axis 18 of a fiber optic target T, the optical axis of the proximal end 20 of the fiber target T is oriented at an angle $\alpha > 0°$ to both the longitudinal fiber axis 18 and reflector optical axis 12, and hence defines an off-axis optical system.

The source S of electromagnetic radiation is placed at $F_1$, thereby resulting in the formation of an image at $F_2$ which defines the point at which the target T should be placed. The reflector M1 is designed to maintain unit magnification in the optimized case (shown in FIG. 5a) by selecting an appropriate length of the minor axis 10 for a given source-target separation distance 21 and then by arranging the target's optical axis 14 so as to maximize the overlap between solid angles of collection and reflection. To obtain approximate unit magnification in an optimized system, the angle $\alpha$ should be decreased as the source-target separation distance 21 increases.

The design characteristics of the ellipsoidal reflector M1 are sensitive to the source-target separation and the type of source S and target T utilized and, therefore, must be designed to match the specific source S and target T used. The parameters of the target T affecting the ellipsoidal design include (i) its size, (ii) its shape, (iii) the source-target separation distance 21, and for a fiber optic target T, (iv) its numerical aperture, (v) its diameter, and (vi) the angle $\alpha$ at which its optical axis 16 at the proximal end 20 of the fiber is oriented with respect to the major axis 8 of the ellipse. The parameters of the source S affecting the ellipsoidal design include (i) its size, intensity contour, and brightness, (ii) the effective solid angle of light emitted, (iii) the optical aberrations caused by the source's envelope 5 and (iv) the size of the envelope.

In the case of a light source S having an envelope 5, forming an imperfect sphere (in practice often an aspherical shape), the resulting optical aberrations and astigmatism can be reduced through the implementation of a specially designed "ellipsoidal" reflector M1 consisting of a first cross-section which forms an ellipse and a second cross-section which substantially forms a circle. In this manner, the aberrations and astigmatism are countered by the distorted ellipsoidal shape of the reflector M1. Additional optical correction can be accomplished through the use of optical elements inserted between the reflector M1 and target T, with or without optical or dielectric coatings on the optical elements. Furthermore, optical preparations can be applied to the inner surface of the reflector M1 after it has been polished to enhance reflection, or to control and/or filter the radiation flux.

(3) Target. The target T is a small object which needs to be irradiated or illuminated with the highest flux density of electromagnetic radiation possible. In the preferred embodiment, it is a single optical fiber with a diameter of approximately 1 mm or smaller. The properties of the optical fiber (i.e., its diameter and numerical aperture) must be matched to the optical characteristics of the system consisting of the source S and primary reflector M1. The efficiency of collection and transmission can be enhanced or controlled by adding optical preparations to the input end of the fiber. Additional preparations can be applied to the output end of the fiber for additional control of the emitted light from the optical fiber.

Alternatively, the target T can be a grouping of optical fibers arranged either symmetrically or asymmetrically and having similar or dissimilar shapes, sizes, materials and numerical apertures. The proximal ends of the fibers are typically flat-polished, perpendicular to the longitudinal axes of the fibers. However, the ends proximal to the reflector M1 can be polished at an angle in order to (i) compensate for both the asymmetric image of the electromagnetic radiation source S, such as an arc lamp, and any astigmatism introduced by the source enclosure 5, such as glass envelope 5, (ii) modify the relative numerical aperture of the fibers with respect to the optical collection system and (iii) adjust for the relative angle of the longitudinal axis of the proximal ends of the fiber optic target T relative to the major axis 8.

(4) Retro-reflector. A retro-reflector M2 reflects and re-focuses radiation from and back through a source S, effectively increasing the brightness of the source S by overlaying an inverted intensity distribution of radiation onto the original source S. In the preferred embodiment of the invention, the retro-reflector M2 is a portion of a toroidal reflector concave relative to the source S. In an alternative embodiment, the retro-reflector M2 is a portion of a spherical reflector. Its optimized design depends on the shape and size of the source relative to the size of the target T (and its numerical aperture in the case of a fiber optic target) and the aspheric correction necessitated by the source envelope 5, if any. Additionally, optical coatings can be applied to the surface of the retro-reflector M2 to enhance its reflectivity, or to control, filter, and/or attenuate the radiation flux. Because the aspheric correction varies with the construction of the source S of electromagnetic radiation, a toroidal retro-reflector M2 tends to provide the greatest versatility in compensating for astigmatism caused by the source enclosure 5.

FIG. 4 illustrates the placement of a source S, a target T, and an ellipsoidal reflector M1 according to a first preferred embodiment of the invention. As discussed above, the source S of radiation is extremely small and is represented as a single point S at $F_1$. Radiation emitted from the source S at the focal point $F_1$ is incident on reflector M1 and forms an image at $F_2$, at which point the target T, such as the collection face of an optical fiber, is placed. The image point at $F_2$ and source S placed at $F_1$ are equidistant from the reflector's optical axis 12 in the preferred embodiment. In practice, however, any portion of the ellipsoidal reflector M1 can be selected as the effective reflecting portion P of the reflector M1 for collecting light at the target T as discussed above as long as the orientation angle $\alpha$ is adjusted appropriately.

Figure 5B:
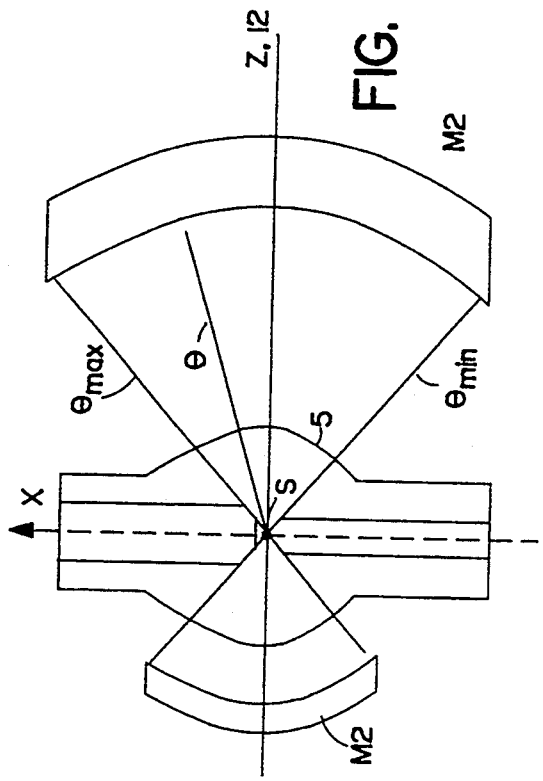
FIG. 5b is a schematic view of the optical system of FIG. 5a in the x-z plane showing the minimum and maximum angles of usable light.

The source S may be enclosed by a glass envelope 5 such as that typical of certain types of electric arc lamps (shown in FIGS. 5a and 5b). A particular advantage of this system is that the specifications of the reflector M1 can be chosen to take into account the diameter of the glass envelope 5 so as to maintain a practical separation distance 21 between the source S and the target T. Once this source-target separation distance 21 has been determined, the length of the minor axis 10 (and hence the curvature of the surface) and the orientation angle $\alpha$ of the target optical axis 14 can be chosen to produce approximately unit magnification. Alternatively, the size of the optical system can be minimized by choosing the shortest minor axis 10 and orientation angle $\alpha$, that achieves unit magnification such that the acceptance cone of the target 16 is unobstructed by the source envelope 5.

Figure 1:
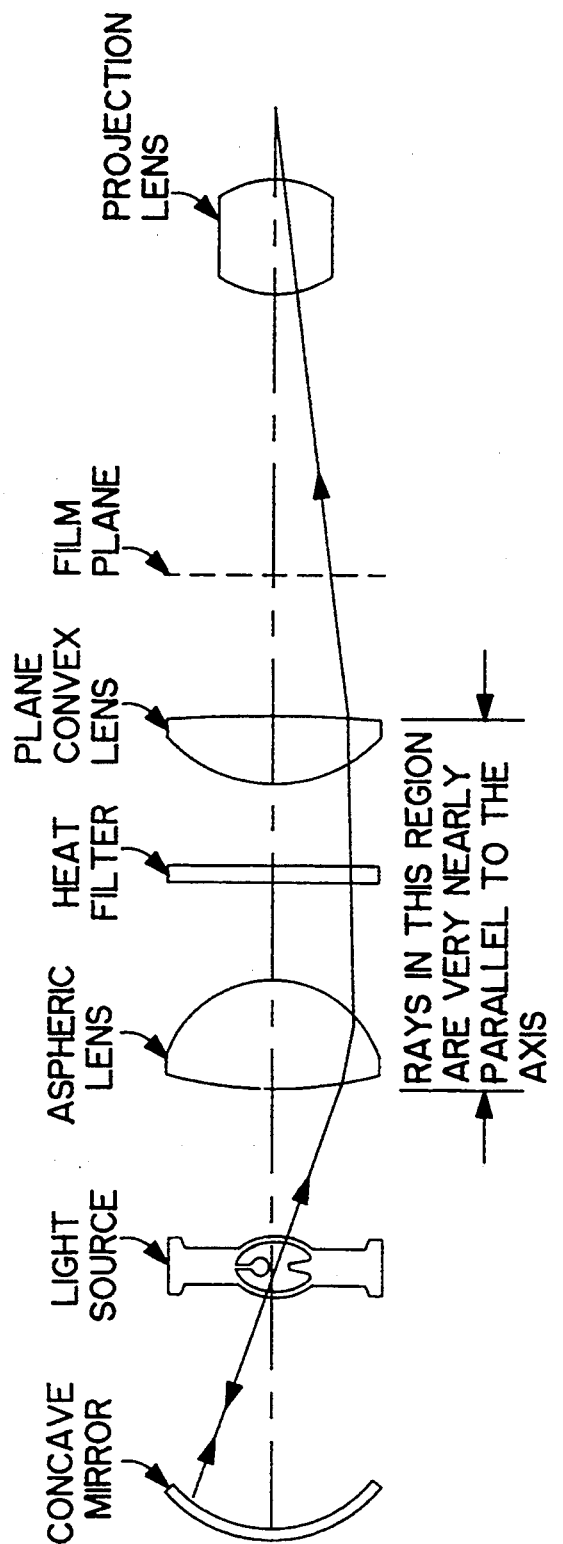
FIG. 1 is a schematic illustration of an on-axis prior art condenser lens system.
Figure 2A:
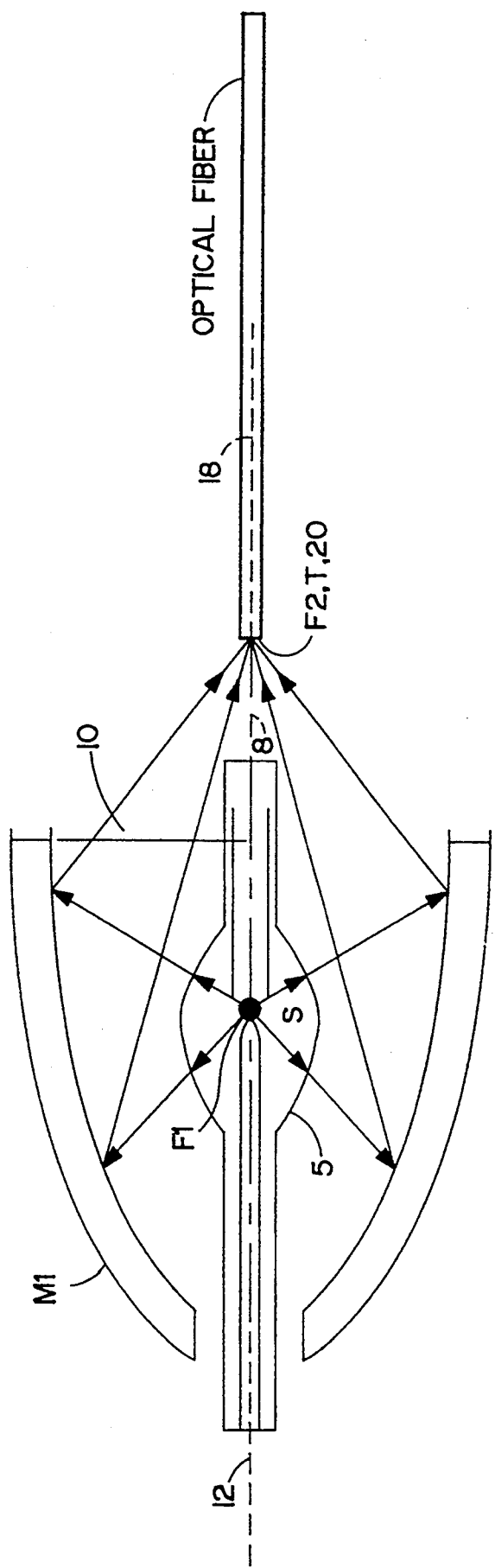
FIG. 2a is a schematic illustration of an on-axis prior art ellipsoidal reflecting system.
Figure 2B:
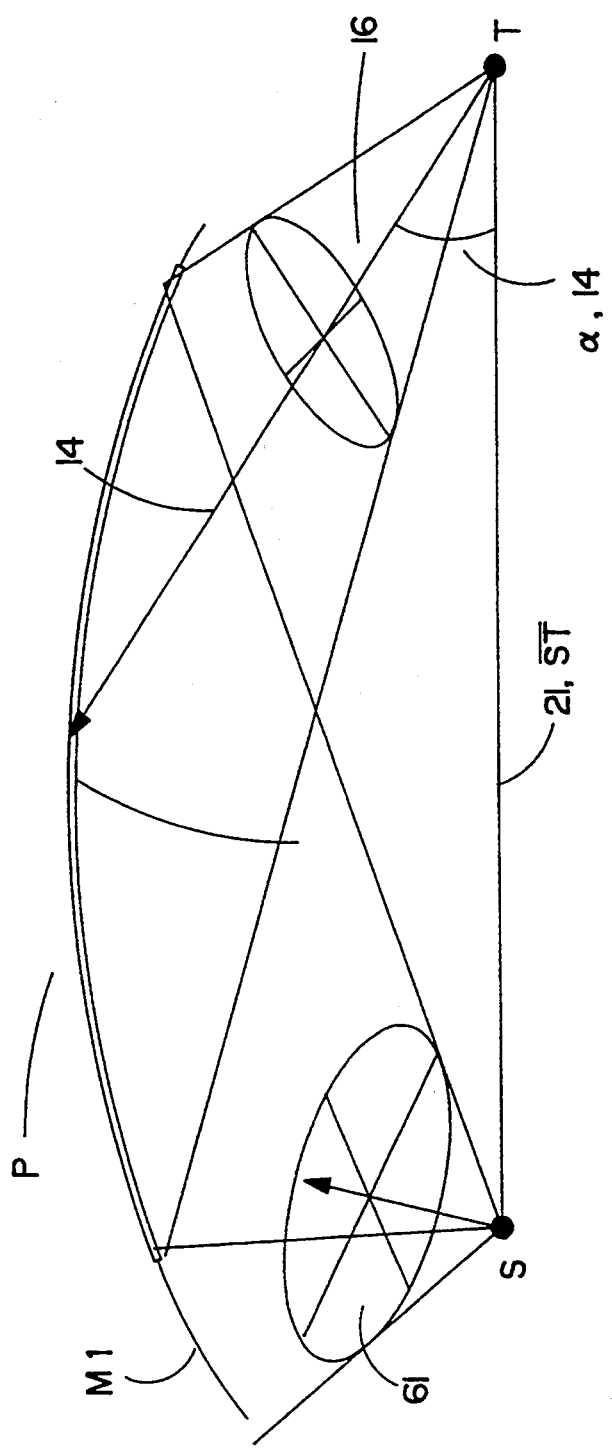
FIG. 2b is a schematic illumination of a generalized off-axis ellipsoidal reflecting system.

Compared to the prior art, FIG. 2a, the surface of the reflector M1 is a portion of an ellipsoidal surface, having major and minor axes 8,10, and two foci located at $F_1$ and $F_2$, such that the major axis 8 is rotated by an angle greater than zero relative to the optical axis of the reflector 12. The curvature of the surface is selected to minimize the distance between $F_2$ and the reflector M1 while maintaining the brightness of the source at the target at approximately unit magnification. For this type of system, maximum collection of flux density at the target T for a given acceptance cone 16 (solid angle) requires that the size of the source S be similar in size or smaller than that of the target T. This follows from the law of brightness (sin (half angle of emission) times area is constant) which limits the best magnification to unity for source and target of similar dimensions. To demagnify the source S (i.e., magnification less than one) would concentrate the radiation into a smaller volume having an increased angular distribution and hence would result in less flux density over the acceptance cone 16 of the target T. To magnify the source S so as to narrow the angular distribution of the image at the target T would cause a larger image overfilling the target. For targets T that are smaller or larger than the source S, curvature of the ellipsoid is chosen so as to achieve maximum collection efficiency under the constraints imposed by the law of brightness in conjunction with the particular characteristics of the target-size and acceptance cone 16. Hence, the advantages of the present invention over the prior art systems include (i) maintaining near unit magnification with minimum image-aberration of the source S at the target T, (ii) maximizing flux density and image brightness at the target T and (iii) optimization of the separation distance 21 between the source S and target T without loss of collection efficiency and unit magnification.

The effective numerical aperture of the source S will depend on the type of source S and its construction. Electric arc lamps contain electrodes, symmetrically shaped for AC operation and asymmetrically shaped for DC operation. These electrodes cause shadowing which reduces the illuminating angle of the source and thereby limits the effective numerical aperture. Moreover, for asymmetric electrodes, the angular distribution of light emanating from the source S will be asymmetric which in turn affects the effective numerical aperture and the optimized collection of electromagnetic radiation at the target T.

Ideally, the relative effective numerical aperture of the reflector M1 will be matched to that of the target T in the preferred embodiment. The angular extent of the reflector M1 is determined by the solid angle of reflected light subtended by the acceptance cone angle, 16, of the target T whereby light is coupled to the target T from the source S. Light reflected at larger angles of incidence relative to the acceptance cone angle of the fiber optic target T is poorly coupled into the optical fiber. If, however, the numerical aperture of a fiber optic target T were sufficiently large, reflected light from a higher numerical aperture (N. A.) reflector would be collectable by the target T. For practical systems consisting of aberrations induced by lamp envelopes, the effective numerical aperture of the fiber at a given orientation angle $\alpha$ can be modified to improve collection efficiency 5–10% by cutting the proximal end 20 at an angle other than 90° to the longitudinal axis 18.

Figure 3A:
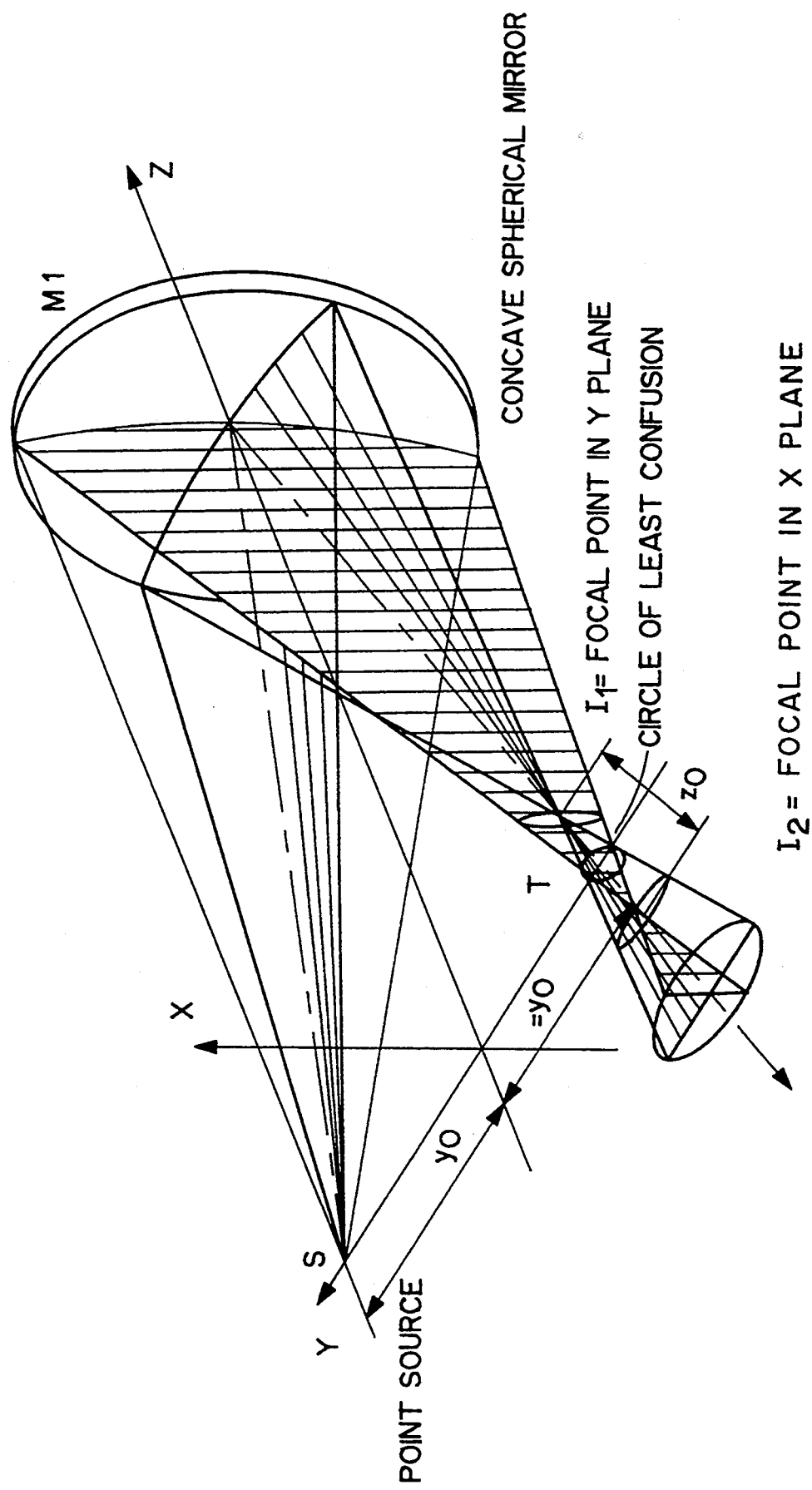
FIG. 3a is a perspective view of a prior art off-axis system employing a spherical reflector.
Figure 3B:
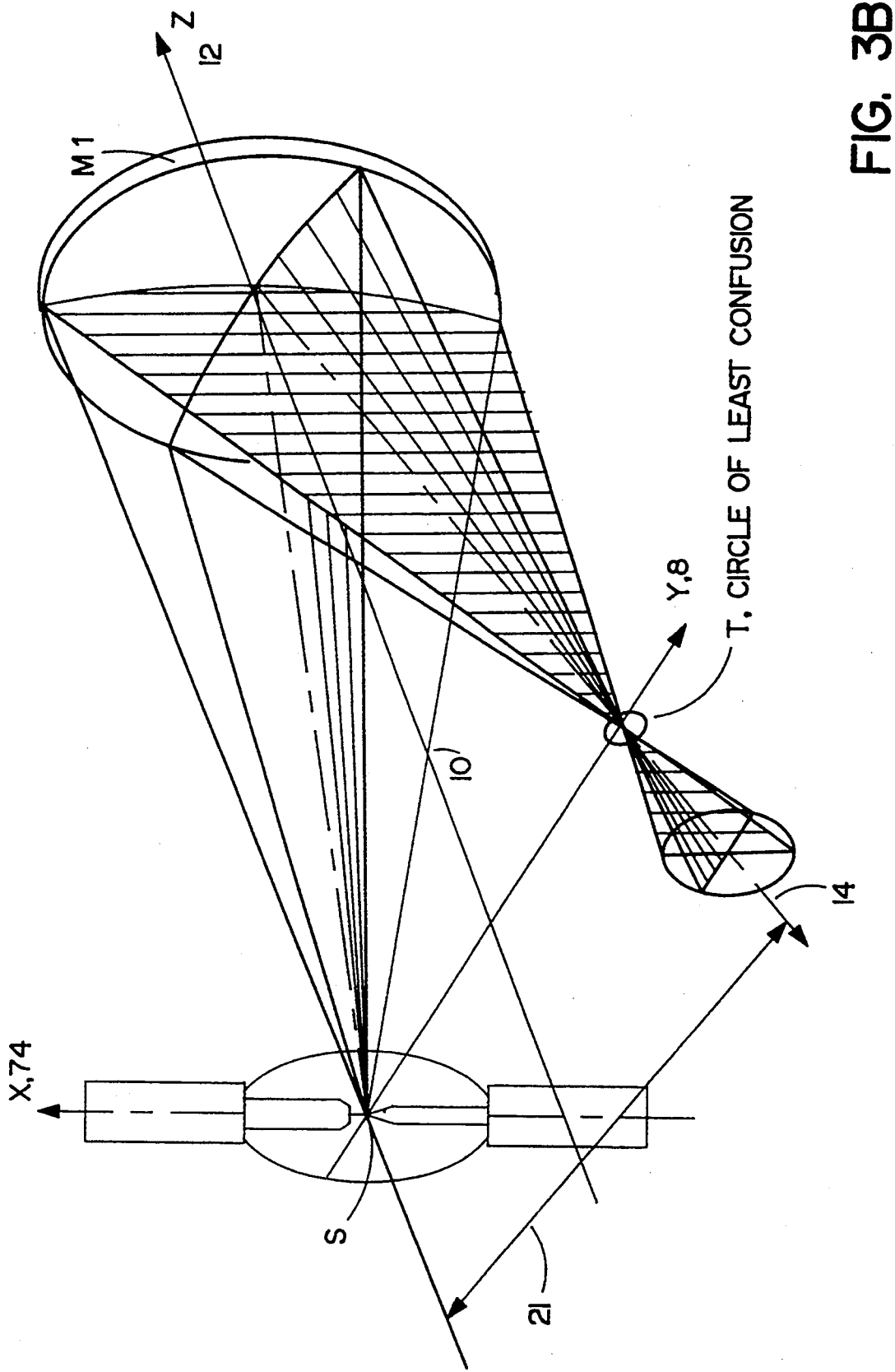
FIG. 3b is a perspective view of a prior art off-axis system employing a toroidal reflector.

It will be observed that the geometry of the system illustrated in FIGS. 5a and 5b of the present invention appears similar to the geometry which is disclosed in FIGS. 3a and 3b of U.S. Pat. No. 4,757,431. However, the prescription for maximizing collectable flux density depends on the specific shape of the surface of reflector M1, whether it be spherical, toroidal, or ellipsoidal. The use of an ellipsoidal reflector M1 (and its defined focal points $F_1$ and $F_2$) produces the least distorted image at the target T compared with either a toroidal or spherical reflector. In contrast to the circle of least confusion produced by the prior art spherical case or the improved relative collection efficiency in the toroidal case, the present invention is nearly free of distortion otherwise caused by optical aberrations created by the off-axis displacement of the source S and target T. From a practical perspective, the choice of surface for the reflector depends on the source-target distance 21 and the properties of the source and the target; the larger the source-target distance 21, the greater optical correction required.

As explained in U.S. Pat. No. 4,757,431, the use of a spherical reflector imposes the restrictions that the square of the off-axis separation distance 21 divided by the radius of curvature of the off-axis reflector be less than the extent of the source S. For the toroidal case, this restriction is reduced, but large off-axis source-target separations result in less than maximum collection efficiency. In the present ellipsoidal case, this restriction is minimized in that the primary and secondary focal points $F_1$, $F_2$, length of the minor axis, and orientation angle $\alpha$ can be selected to accommodate varying source-target distances and provide improved collection efficiency over that attainable with either a toroidal or a spherical reflector.

As illustrated in the prior art FIG. 2a, the image point (i.e., the secondary focal point $F_2$) used in "on-axis" elliptical reflectors M1 must be quite distant from the source S (i.e., the primary focal point $F_1$) to provide sufficient distance between the source S and the target T (at $F_2$). This separation distance results in image magnification greater than one, reducing the collectable flux by a small target. A second disadvantage to this prior art is that a substantial amount of light is blocked from collection at $F_2$ because of electrode-shadowing and lamp geometry. Moreover, the lamp-reflector geometry also requires a larger, more costly surface which itself is not easily modified to correct for lamp-envelope induced optical aberrations. The configuration of the present invention, however, allows the image to be up to be substantially closer to the source than is possible for similar components having the configuration illustrated in FIG. 2a. Furthermore, an important advantage of this invention is the available range of control of image magnification. By appropriate selection of the minor axis, image position, and orientation angle $\alpha$, maximum collection efficiency is made possible. (Collection efficiency is the collectable light available at the target compared with that which is actually collected by the target.) The primary limitation on the present system is the available collection angle of the fiber optic target T; i.e., the numerical aperture.

The radiation collection system of the present invention is able to maximize the collectable flux density at a given target T if (i) the numerical aperture of the target T and the effective numerical aperture of the ellipsoidal reflector M1 are matched and (ii) the brightness of the source S is preserved at the image target T typically requiring unit magnification for source S and target T of similar size. For any given target T and source S, it is possible to choose an ellipsoid M1 to achieve the maximum brightness of an image for maximum coupling to the target T, thereby optimizing the collection efficiency. For unmatched systems, conditions can be found to optimize the light collected by the target T, though neither the efficiency nor the image brightness will necessarily have been optimized to achieve the maximum result. Although the use of a reflective or imaging light concentrating adapter can be used to adjust for a mismatch of numerical apertures, the image size will increase proportionally according to the Law of Brightness. However, in the use of multiple fiber optics at the target T for optical collection of flux density, proper design of the characteristics of the reflector M1, source S, and fiber optic targets T in conjunction with a non-imaging light concentrating adapter can lead to additional design flexibility.

A fiber optic target T may consist of one or more fibers placed at the image point $F_2$ in FIGS. 4 and 5a. The proximal end(s) 20 of the fiber(s) located at T may be cut so as to produce either a circular or elliptical cross section (hereafter called the proximal angle). The preferred proximal angle depends on the positioning of the longitudinal axis 18 of the optical fiber. For multiple fibers (of similar or different composition) placed at the focal point $F_2$, the proximal angle and diameter of each fiber may vary. Although the numerical apertures of the individual fibers of a multiple fiber optic target T should be optimized for maximum coupling efficiency of the optical system, they may vary depending on the intended application. Similarly, optical coatings applied to the ends of each fiber in a multiple fiber target T may also vary depending on the application. The flux density collectable by the target T may be increased with a light concentrating adapter if the combined diameter of the fiber optic targets T is large in comparison to the image size without the use of a light concentrating adapter. If this is the case, the adapter will enable the transformation of radiation having a greater numerical aperture than that of the target(s) into radiation having a numerical aperture less than or equal to that of the target(s), but with a corresponding increase in image size. Hence, maximizing the collectable flux density for a multiple fiber optic target T may be facilitated by matching the optical characteristics of the target T with that of the source S, the ellipsoidal reflector M1, and a light concentrating adapter.

For practical systems involving a given source S and ellipsoidal reflector M1 optimized for a target T of specified characteristics (e.g., diameter, shape, and numerical aperture for a fiber optic target T), use of targets T having sizes or numerical apertures other than those of the optimized target T may require different positioning of the target T at $F_2$ relative to the reflector M1 and the source S. A "non-optimum" target T at the image point $F_2$ should be positioned to capture the most concentrated portion of the flux density, which will depend on the brightness of the source S. For arc sources S and other similar extended sources S, that portion of the intensity contour collectable by a non-optimum fiber optic target T will depend on the specific target size and numerical aperture. For targets T much smaller than the source S, there may exist more than one part of the intensity contour that produces the same collectable flux density at the target T, enabling the target T to be placed at a locus of points to achieve similar collectable flux densities.

In an alternate embodiment of the present invention, a concave "retro-reflector" M2, as shown in FIGS. 5a, 5b, 7a, and 7b, may be placed behind the source S opposite the primary reflector M1 to enhance further light collection. Preferably, the retro-reflector M2 has a toroidal reflecting surface which provides flexibility in compensating for astigmatism and aberrations caused by the non-uniform glass envelopes 5 of many sources S. The radii of curvature of the retro-reflector M2 should ideally be matched to the source S, and the shape of the lamp envelope. Alternative designs of the retro-reflector M2 with a spherical shape may be used in the system although they do not afford as much optical flexibility in compensating for variations in the shape and glass thickness of a source envelope 5. Moreover, toroidal retro-reflectors are capable of compensating for the asymmetric envelope of a DC arc lamp, and additionally improve the total radiation flux collected at the target in comparison with a spherical retro-reflector M2.

Figure 7A:
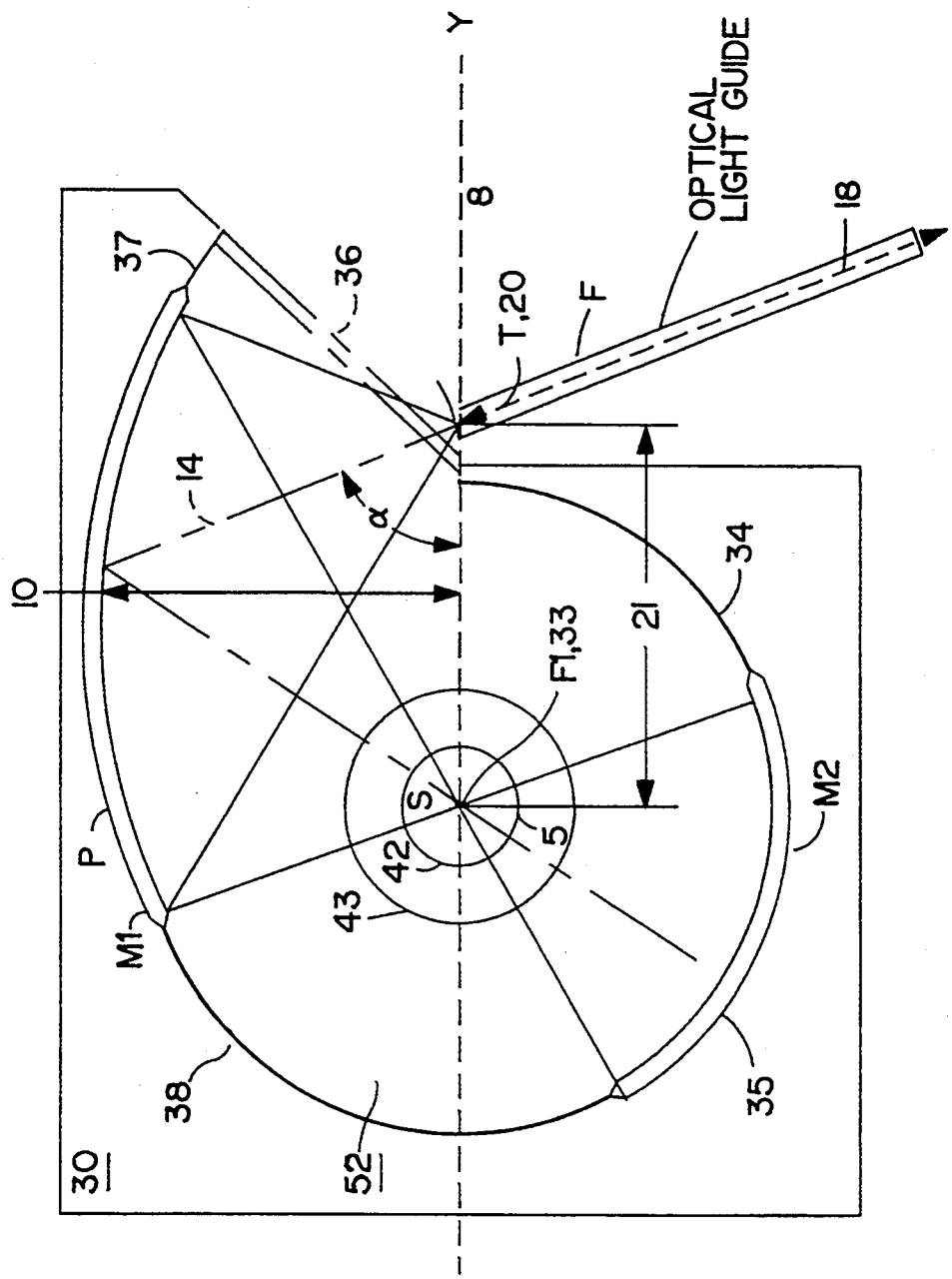
FIG. 7a is a schematic view of a second embodiment of the present invention showing an implementation of the off-axis optical system in a nautilus-shaped housing having a window forming a transparent, planar surface inclined with respect to the major axis such that the resulting image is formed distant from the housing.
Figure 7B:
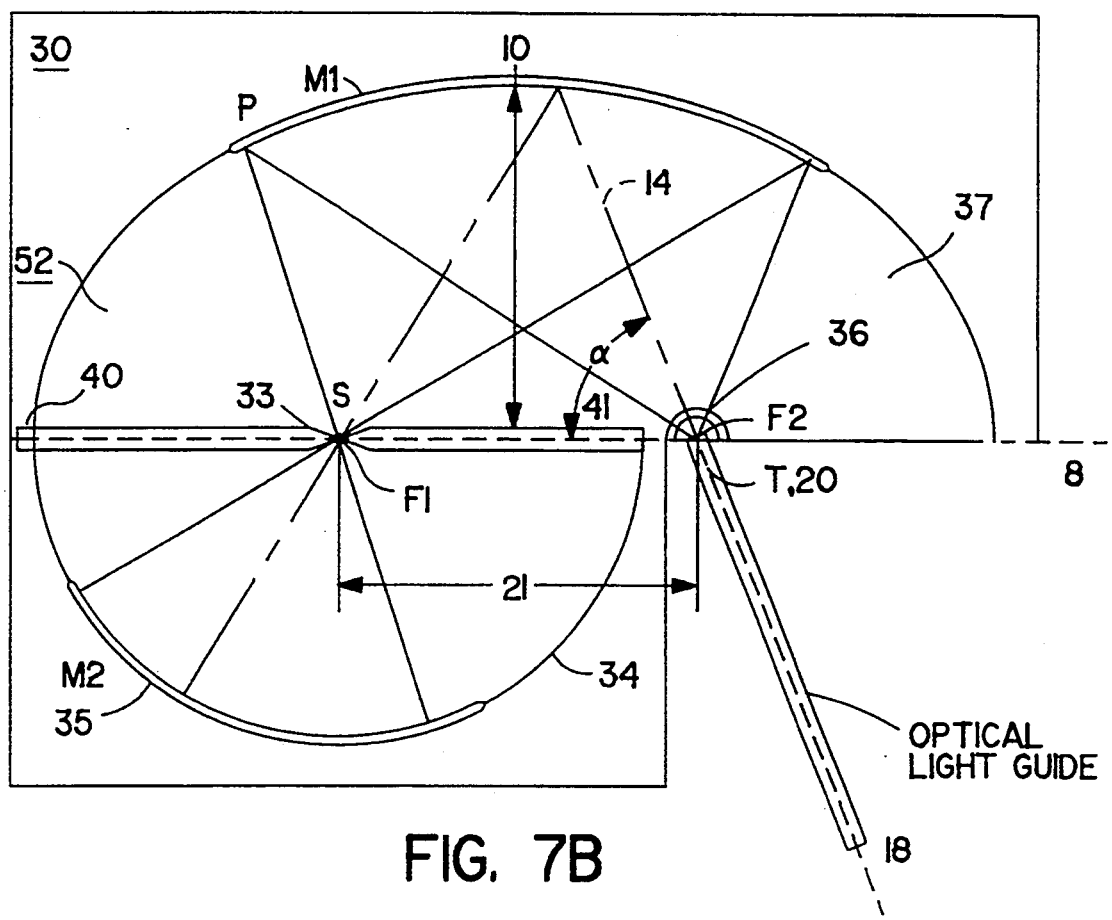
FIG. 7b is a schematic view of the second embodiment of the present invention showing an implementation of the off-axis optical system in a nautilus-shaped housing having a hemispherical window adapted for the reception of a fiber optic target.

In a second alternate embodiment of the present invention, as shown in FIGS. 7a and 7b, the components of the system are arranged in a housing 30 having an internal cavity 52 in the shape of a nautilus-shell in which a source S is positioned in the center 33 of the circular portion 34 of the cavity 52 when viewed from the top (as in FIGS. 7a and 7b). The sides of the housing 30, forming the internal cavity 52 preferably form a single reflector encompassing a retro-reflector portion 35 disposed behind the source S on an inner surface, the cross section for which is a circular portion 34, an effective ellipsoidal reflecting portion P disposed in front of the source S on an ellipsoidal, inner surface, 38, and a window 36 disposed at a radiation collecting end 37 of the housing 30. However, the housing 30 may also form a rigid, plastic, ceramic, composite, or light metal structure having suitable fasteners for attachment of the retro-reflector portion 35 and the effective ellipsoidal reflecting portion P thereto, or alternatively, having the components formed in the material of the housing 30 itself.

As shown in FIG. 7b, the housing 30 can be adapted for permanent affixation of a source S such as an arc lamp having its anode 40 and cathode 41 placed on the major axis 8 of the effective ellipsoidal portion P or at an angle to the major axis 8, but in all cases such that its arc gap is disposed in the center 33 of the housing's circular portion 34. In this case, the housing 30 would include a top and a bottom surface and be completely sealed and pressurized with an ionizing gas and fitted with electrodes chosen to maximize brightness and minimize the angular extent of the arc produced. Alternatively as shown in FIG. 7a, the housing 30 may be adapted for the use of a detachable, plug-in lamp 42 which can be inserted into a circular aperture 43 in the top of the housing 30 concentric with the circular portion 34 of the housing 30. In either case, the window 36 at the radiation collecting end 37 of the housing 30 can form either a transparent, planar surface of a non-imaging material (i.e. optical quartz or sapphire), an imaging optical lens or other optical element (see FIG. 7a), or a non-imaging, hemispherical window formed within a planar surface suitable for the reception and attachment of a fiber optic target T (see FIG. 7b). When a transparent, planar surface is utilized as the window 36, the plane in which the surface is formed should be displaced at an angle with respect to the major axis 8 of the effective ellipsoidal reflecting portion P such that the resulting image at the focal point $F_2$ lies outside of the housing 30. In this manner, greater flexibility is afforded in the use of the present invention since various targets T may then be utilized. When the window forms a non-imaging, hemispherical window 36 set within a planar surface, the plane in which the surface lies is preferably disposed along the major axis 8 of the effective ellipsoidal reflecting portion P.

Figure 8:
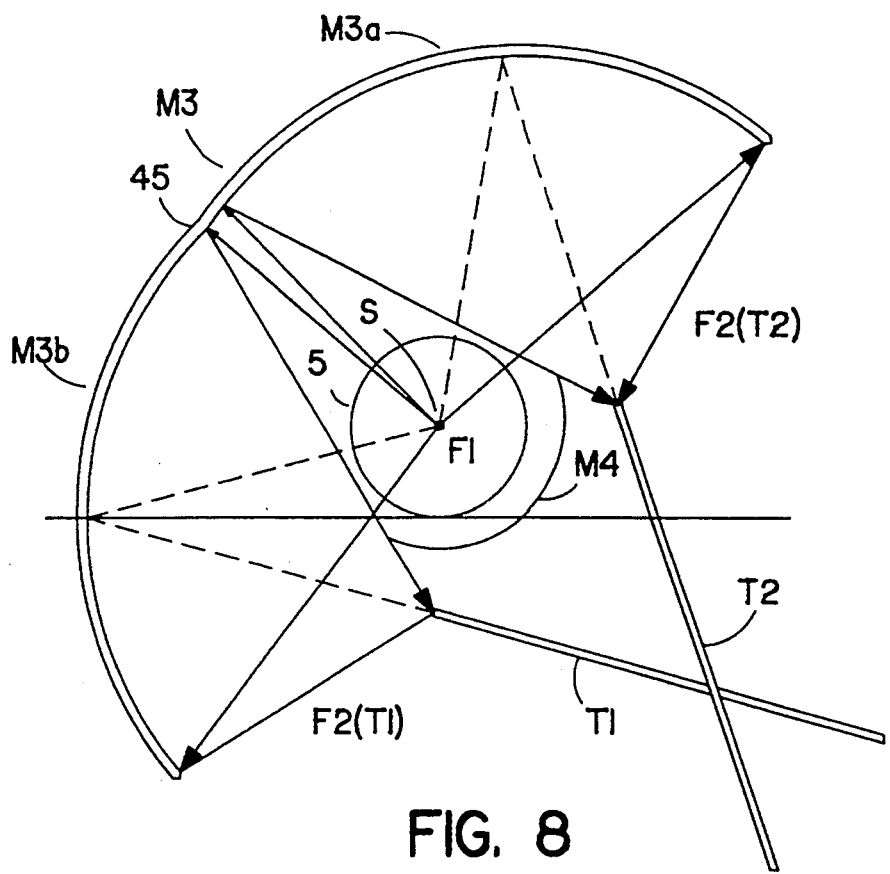
FIG. 8 is a schematic view of a third embodiment of the present invention showing an implementation of the off-axis optical system in a compound ellipsoidal reflector configuration for supplying radiation from the source to two different targets.

In a third alternate embodiment, illustrated in FIG. 8, a more complex reflecting surface M3 of a nearly hemispherical shape is employed having first and second ellipsoidal reflecting portions M3a, M3b coupled together along a common side 45 so as to couple light from a single source S to two different targets T1, T2. This so-called "compound ellipsoidal reflector" M3 is formed by the union of portions of two ellipsoidal reflectors M3a, M3b. Half of the light emitted in one hemisphere of the source S is focused by the reflecting surface M3a at the first target T1 and the remaining half is focused by the reflecting surface M3b at the second target T2. Reflecting surface M3a is defined by two foci, one of which is located at the source S and the other at the first target T1. Likewise, ellipsoidal reflecting surface M3b is defined by two foci, one of which is also located at the source S, the other being located at the second target Light emitted by the source S is collected and condensed by reflector M3 to form two images at the targets T1 and T2.

Optionally, a toroidal, spherical, or other concave aspheric toroidal retro-reflector M4, similar to that previously described, may be placed behind the source S opposite the reflector M3 to increase further the collected flux density. As illustrated in FIG. 8, the use of the retro-reflector M4 results in essentially all of the light emitted by source S being collected at the targets T1,T2. A particular advantage of this embodiment is the flexibility of the design in allowing the use of the retro-reflector M4 for a dual target system. Another advantage is the resulting reduction in the number of customized reflectors that must be integrated into a single piece, including both the primary, off-axis reflector M3 and the optional, retro- reflector M4. This reduction minimizes the fabrication costs, particularly for molded parts, and minimizes system assembly costs by reducing the number of parts that must be assembled and aligned. However, the compound reflector (ellipsoidal, toroidal, or spherical) also may be fabricated as two separate reflectors for use in systems of two targets (e.g., fiber optic outputs) depending on how a practical system is to be aligned. Whether the compound reflector is formed as a single part or two parts, the embodiment of the compound reflector design, consisting of an ellipsoidal, toroidal, or spherical compound reflector and a retro-reflector M4 can also be fabricated in a housing in which the inner cavity has a dual nautilus shape in which each of the two cavities each has a nautilus-shape associated with a target.

It will be recognized that the above described ellipsoidal invention may be embodied in other specific arrangements and housings and may include the use of other types of reflectors as special cases of the ellipsoidal reflector without departing from the spirit or essential characteristics of this disclosure. Moreover the embodiment comprising the single nautilus-shaped inner cavity having an ellipsoidal inner surface could also be embodied in other specific arrangements in which the ellipsoidal inner surface takes on an alternative shape including toroidal, spherical, and aspherical toroidal. Thus, it is understood that the invention is not to be limited by the foregoing illustrative details, but rather is to be defined by the appended claims.

We claim:

1. A system for condensing and collecting electromagnetic radiation, the system comprising a source, a reflector and a target, wherein:

the reflector has an ellipsoidal surface portion having a curvature concave relative to both the target and the source of radiation and an effective ellipsoidal reflecting portion defined by a portion of the ellipsoidal surface portion radiated by the source and subtended by an acceptance cone of the target, the effective ellipsoidal reflecting portion having a major axis with first and second focal points defined by the elliptical curvature of the ellipsoidal surface portion;

the source of radiation radiates into substantially all directions and is disposed proximate to the first focal point of the effective ellipsoidal reflecting portion so as to produce a substantially focused image of the source at the second focal point of the effective ellipsoidal reflecting portion;

the target is an optical fiber disposed proximate to the second focal point for receiving the radiation collected and subsequently redirected by the effective ellipsoidal reflecting portion, the target having an optical axis offset from the major axis of the effective ellipsoidal reflecting portion; and the configuration of the reflector and the orientation of the optical fiber are selected to provide approximately no magnification of the source and to provide substantially maximum flux density at an entrance aperture of the optical fiber.

2. The system of claim 1, wherein the effective ellipsoidal reflecting portion comprises a first cross-section of a substantially circular shape and a second cross-section of a substantially non-circular elliptical shape.

3. The system of claim 2, wherein the source of radiation comprises a lamp having an envelope and the first and second cross sectional shapes of the effective ellipsoidal reflecting portion are configured to compensate for optical aberrations in the focused image caused by the envelope of the lamp.

4. The system of claim 1, wherein the source of radiation comprises a lamp having an envelope, and a correcting optic is disposed between the effective ellipsoidal reflecting portion and the target to compensate for optical aberrations in the focused image caused by the envelope of the lamp.

5. The system of claim 1, wherein the effective ellipsoidal reflecting portion forms the entire ellipsoidal surface portion of the reflector.

6. The system of claim 1, wherein the source of electromagnetic radiation comprises a light source selected from the group consisting of an electric AC arc lamp, an electric DC arc lamp, and a gas-discharge lamp.

7. The system of claim 1, wherein the radiation emitted by the source comprises radiation selected from the group consisting of pulsed radiation, continuous-wave radiation, coherent radiation, incoherent radiation, monochromatic radiation, broad-band radiation and narrow-band radiation.

8. The system of claim 1, wherein the optical fiber has a proximal end cut at an angle other than perpendicular to a longitudinal axis of the proximal end of the optical fiber.

9. The system of claim 1, wherein the system further comprises a rear reflector disposed substantially opposite from the effective ellipsoidal reflecting portion of the reflector relative to the source for reflecting radiation emitted from the source back through the source and onto the effective ellipsoidal reflecting portion, the rear reflector having a surface concave relative to the source comprising a portion of a shape selected from the group consisting of a substantially toroidal shape, a substantially spherical shape and an aspherical toroidal shape.

10. The system of claim 9, wherein the surfaces of the rear reflector the effective ellipsoidal reflecting portion are treated with optical preparations to control the radiation flux.

11. The system of claim 9, wherein the system further comprises a housing with sides having inner surfaces forming at least one substantially nautilus-shaped cavity, the nautilus-shaped cavity being defined in part by a first ellipsoidal inner surface forming the ellipsoidal surface portion of the reflector, and a second arcuate inner surface forming the rear reflector.

12. The system of claim 11, wherein the housing further comprises a top and a bottom affixed to the sides of the housing to form a sealed enclosure.

13. The system of claim 11, wherein the effective ellipsoidal reflecting portion disposed on the first ellipsoidal, inner surface and the rear reflector disposed on the second arcuate inner surface are arranged with respect to one another to position the first focal point of the ellipsoidal inner surface approximately coincident with an origin of the second arcuate inner surface.

14. The system of claim 13, wherein the effective ellipsoidal reflecting portion of the first ellipsoidal, inner surface and the rear reflector of the second arcuate inner surface of the housing are joined at one side to form a contiguous reflector disposed about the inner surfaces of the housing.

15. The system of claim 11, wherein the housing further comprises a window disposed at a radiation collecting end of the housing for passage of radiation from within the housing to the optical fiber.

16. The system of claim 15, wherein the window and the surfaces of the rear reflector, and the effective ellipsoidal reflecting portion are treated with at least one optical preparation to control the radiation flux.

17. The system of claim 15, wherein the window comprises a planar surface disposed along the major axis of the effective ellipsoidal reflecting portion at the radiation collecting end of the housing, the planar surface being formed from an element selected from the group consisting of a transparent, non-imaging optical element and a transparent imaging optical element.

18. The system of claim 15, wherein the window comprises a planar surface having a transparent, non-imaging, hemispherical window formed within the planar surface, the hemispherical window being centered about the second focal point of the effective ellipsoidal reflecting portion.

19. A system for condensing and collecting electromagnetic radiation, the system comprising a source, first and second reflectors, and first and second targets, wherein:

the first reflector has a first ellipsoidal surface portion with a curvature concave relative to both the first target and the source of radiation and a first effective ellipsoidal reflecting portion defined by a portion of the first ellipsoidal surface portion radiated by the source and subtended by an acceptance cone of the first target, the first effective ellipsoidal reflecting portion having a first major axis with first and second focal points defined by the elliptical curvature of the first ellipsoidal surface portion;

the second reflector has a second ellipsoidal surface portion with a curvature concave relative to both the second target and the source of radiation and a second effective ellipsoidal reflecting portion defined by a portion of the second ellipsoidal surface portion radiated by the source and subtended by an acceptance cone of the second target, the second effective ellipsoidal reflecting portion having a second major axis with first and second focal points defined by the elliptical curvature of the second ellipsoidal surface portion;

the first and second reflectors are angularly offset from one another with the first focal point of the first effective ellipsoidal reflecting portion approximately coincident with the first focal point of the second effective ellipsoidal reflecting portion;

the source of radiation radiates into substantially all directions and is disposed proximate to the coincident first focal points of the first and second effective ellipsoidal reflecting portions so as to produce a substantially focused image of the source at the second focal point of each of the first and second effective ellipsoidal reflecting portions;

the first target is an optical fiber disposed proximate to the second focal point of the first effective ellipsoidal reflecting portion for receiving radiation collected and subsequently redirected by the first effective ellipsoidal reflecting portion;

the second target is an optical fiber disposed proximate to the second focal point of the second effective ellipsoidal reflecting portion for receiving radiation collected and subsequently redirected by the second effective ellipsoidal reflecting portion;

the first and second targets each have an optical axis offset from the major axis of each of the first and second effective ellipsoidal reflecting portions, respectively; and the configuration of the reflectors and the orientation of the optical fibers are selected to provide approximately no magnification of the source and to provide substantially maximum flux density at entrance apertures of the optical fibers.

20. The system of claim 19, wherein the first and second targets each have an optical axis disposed at an angle greater than zero degrees to the major axis of each first and second effective ellipsoidal reflecting portions, respectively, so as to maintain the brightness of the source at the first and second targets, respectively.

21. The system of claim 19, wherein the first effective ellipsoidal reflecting portion forms the entire ellipsoidal surface portion of the first reflector and the second effective ellipsoidal reflecting portion forms the entire ellipsoidal surface portion of the second reflector.

22. The system of claim 19, wherein the first and second reflectors are contiguous.

23. The system of claim 19, Wherein the first and second reflectors are formed from a single piece of material.

24. The system of claim 19, wherein the first and second effective ellipsoidal reflecting portions each comprise a first cross-section of a substantially circular shape and a second cross-section of a substantially elliptical shape.

25. The system of claim 24, wherein the source of radiation comprises a lamp having an envelope and the first and second cross sectional shapes of each of the first and second effective ellipsoidal reflecting portions are configured to compensate for optical aberrations in the focused image caused by the envelope of the lamp.

26. The system of claim 19, wherein the source of radiation comprises a lamp having an envelope, and the system further comprises a first correcting optic disposed between the first effective ellipsoidal reflecting portion and the first target and a second correcting optic disposed between the second effective ellipsoidal reflecting portion and the second target to compensate for optical aberrations in the focused image at the first and second targets, respectively, caused by the envelope of the lamp.

27. The system of claim 19, wherein the source of electromagnetic radiation comprises a light source selected from the group consisting of an electric AC arc lamp, an electric DC arc lamp, a gas-discharge lamp, and a filament lamp.

28. The system of claim 19, wherein the radiation emitted by the source comprises radiation selected from the group consisting of pulsed radiation, continuous-wave radiation, coherent radiation, incoherent radiation, monochromatic radiation, broad-band radiation and narrow-band radiation.

29. The system of claim 19, wherein the first and second optical fibers each have proximal ends cut at an angle other than perpendicular to a longitudinal axis of the respective proximal ends of the optical fiber.

30. The system of claim 19, wherein the system further comprises a rear reflector disposed substantially opposite from a point equidistant between the first and second effective ellipsoidal reflecting portions relative to the source for reflecting radiation emitted from the source back through the source and onto at least one of the first and second effective ellipsoidal reflecting portions, the rear reflector having a surface concave relative to the source, and comprising a portion of a shape selected from the group consisting of a substantially toroidal shape, a substantially spherical shape and an aspherical toroidal shape.

31. The system of claim 30, wherein the surfaces of the rear reflector and the first and second effective ellipsoidal reflecting portions are treated with optical preparations to control radiation flux.

32. The system of claim 1, wherein an optical axis of the entrance aperture of the optical fiber is positioned such that a normal extending from a point of intersection of the optical axis and the ellipsoidal reflecting surface bisects a vector extending between the source of radiation and the entrance aperture of the optical fiber.

33. The system of claim 19, wherein the optical axes of the entrance apertures of the optical fibers are positioned such that respective normals extending from points of intersection of the respective optical axes and the ellipsoidal reflecting surfaces bisect vectors extending between the respective sources of radiation and the respective entrance apertures of the optical fibers.

* * * * *

UNITED STATES PATENT AND TRADEMARK OFFICE
CERTIFICATE OF CORRECTION

PATENT NO. : 5,414,600
DATED : May 9, 1995
INVENTOR(S) : Strobl et al.

It is certified that error appears in the above-identified patent and that said Letters Patent is hereby corrected as shown below:

In column 2 line 9 change "respective to" to --respect to--;

In column 3 at line 2 change ":magnification" to --magnification--

In claim 23 in column 16 at line 26 change "Wherein" to --wherein--

Signed and Sealed this

Sixth Day of February, 1996

*Attest:*

BRUCE LEHMAN

*Attesting Officer*   *Commissioner of Patents and Trademarks*